(No Model.)
E. PINCHETTI.
MEDICAL THERMOMETER.
No. 559,205. Patented Apr. 28, 1896.
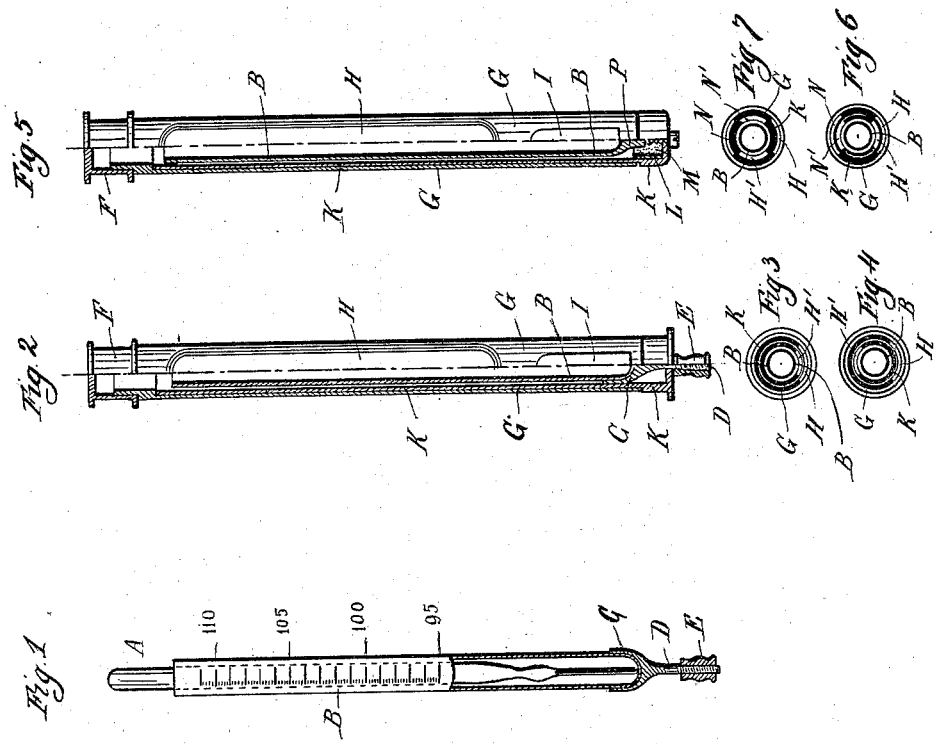

UNITED STATES PATENT OFFICE.

ENRICO PINCHETTI, OF LUGANO, SWITZERLAND.

MEDICAL THERMOMETER.

SPECIFICATION forming part of Letters Patent No. 559,205, dated April 28, 1896.

Application filed September 18, 1894. Serial No. 523,412. (No model.)

*To all whom it may concern:*

Be it known that I, ENRICO PINCHETTI, a subject of the King of Italy, residing at Lugano, Switzerland, have invented certain new and useful Improvements in Medical Thermometers, of which the following is a specification.

My invention relates to clinical thermometers as employed by physicians for ascertaining the temperature of the body of their patients.

It has often been said that the use of clinical thermometers is a cause of infection and promotes the communication of diseases, as the scale out of the glass carries dirt, dust, and other germ-bearing matters.

My invention, which removes the above objection, consists in subdividing the usual thermometer into three parts, two of which are connected with each other when the thermometer is being employed.

First. An ordinary thermometer whose tube bears no scale or engraving of any kind and whose exterior surface being perfectly smooth and having no grooves or cuts can retain no morbid parts adhering thereto and may therefore be with impunity brought into contact with the seat of disease by the most scrupulous physician.

Second. A tube open at one of its ends and bearing on its cylindrical surface the marks of the ordinary thermometer-scales, (Fahrenheit or centigrade.) The graduation of the open tube bears such a relation to the length of the thermometer that when this is inserted into the former so as to abut with its bulb against the bottom of the graduated tube the reading of the number visible on the mark of the Fahrenheit or centigrade scale, which happens to coincide with the upper level of the mercury, at once gives the temperature sought for.

Third. A metal casing with which the graduated tube is permanently surrounded in order to protect it against breakage. The casing is fitted with openings in order to admit of the reading of the temperature on the graduated tube, while those openings may be closed after each lecture, when the thermometer is to be carried from one place to another.

Figure 1 shows the thermometer A inserted into the graduated tube B, the casing being entirely removed. The bottom of tube B fits into a metal cup C, being secured thereto through a convenient cement. The cup C ends in a pin D, fitted with screw-threads, on which a nut E is tightly screwed, so that on turning the nut E the tube C is also caused to rotate. Fig. 2 shows the above parts partly in section and partly in external view, the graduated tube being shown surrounded with its casing, but without the thermometer. Figs. 3 and 4 are sectional plans of Fig. 2, respectively, in the open and closed positions.

The casing consists, first, of a cap F, which is not in place when the thermometer is to be employed, in order to allow of its being rapidly introduced into the graduated tube after its removal from the patient; second, of a fixed exterior sheath G, fitted with two openings H and I, the former enabling the operator to read the scale on the graduated tube, while the latter gives sight of the bulb of the thermometer when lying on the bottom of the graduated tube; third, of an interior socket K, fitted with an opening H' and a second opening corresponding to H and I, respectively. The said socket K can be turned within the sheath G. The pin D enters loosely a corresponding hole in the bottom of socket K, so that K and B may be turned independently to bring opening H' in coincidence either with H, when the temperature is to be read, Fig. 3, or with the closed part of the sheath G, when the apparatus is ready for transport, Fig. 4. In the position of K (shown in Fig. 3) the nut E may be used to turn the graduated tube B in order to bring either the Fahrenheit or the centigrade scale opposite to the openings H and H'.

Figs. 5, 6, and 7, which correspond to Figs. 2, 3, and 4, respectively, show a somewhat modified form of the apparatus. (The same letters are applied to corresponding parts.) The graduated tube B can no longer be rotated within the socket K, but is connected thereto and shares its movements. The tube B ends in a nipple P, which is embedded into a layer M of cement, fitting into a metal box L, tightly screwed on the bottom of the socket K. Each of the sockets G and H is fitted with a couple of openings H and N, H' and N' opposite to each other. By turning socket K the thermometer is brought from the position of Fig. 6, in which both thermometer-scales are visible from the openings H H' on one side and N N' on the other side to the position of Fig. 7, in which the openings H' and N' are covered by closed portions of sheath G.

Besides the advantage formerly alluded to my apparatus causes a much smaller expense in the case of breakage than the ordinary clinical thermometers, as both the thermometer and graduated tube, either of which could happen to get broken, are to be had at a much lower expense than clinical thermometers of the ordinary description affording the same degree of exactness.

It is well known that the mercury has a tendency to rise in the thermometer-tube some time after the thermometer has been in use. The adjustment necessary to remove the error of graduation ensuing therefrom is also rendered much easier, as the origin of the scale can be displaced by simply displacing the bottom of the graduated tube by blowing into the same when properly heated.

I claim as my invention—

1. A casing for a clinical thermometer comprising the graduated transparent tube having one open and one closed end, the inclosing case therefor to which the closed end of the graduated tube is secured, said inclosing casing having an opening and the outer revoluble casing, substantially as described.

2. A clinical thermometer comprising an ungraduated mercury-tube and a transparent tube for holding the same having graduations thereon and being of such diameter as to closely fit the mercury-tube whereby the readings may be accurately made, substantially as described.

In witness whereof I have hereunto set my hand in presence of two witnesses.

ENRICO PINCHETTI.

Witnesses:
OTTORINO LAZZARI,
CARILLO CATTINO.